J. P. CROWLEY.
APPARATUS FOR AND METHOD OF DRAWING SHEET GLASS.
APPLICATION FILED MAY 16, 1919.
1,428,533. Patented Sept. 12, 1922.
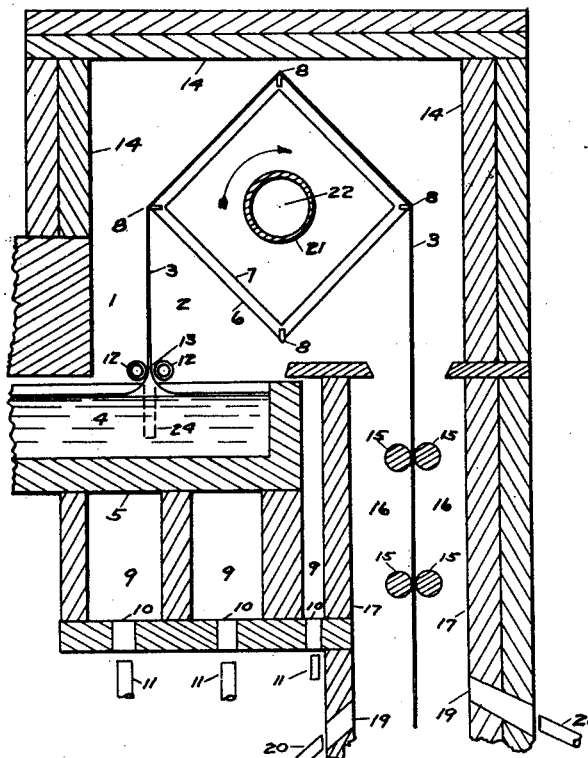
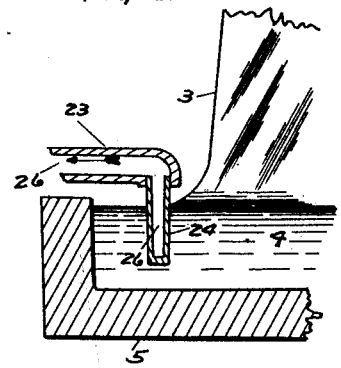
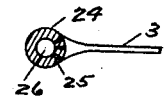
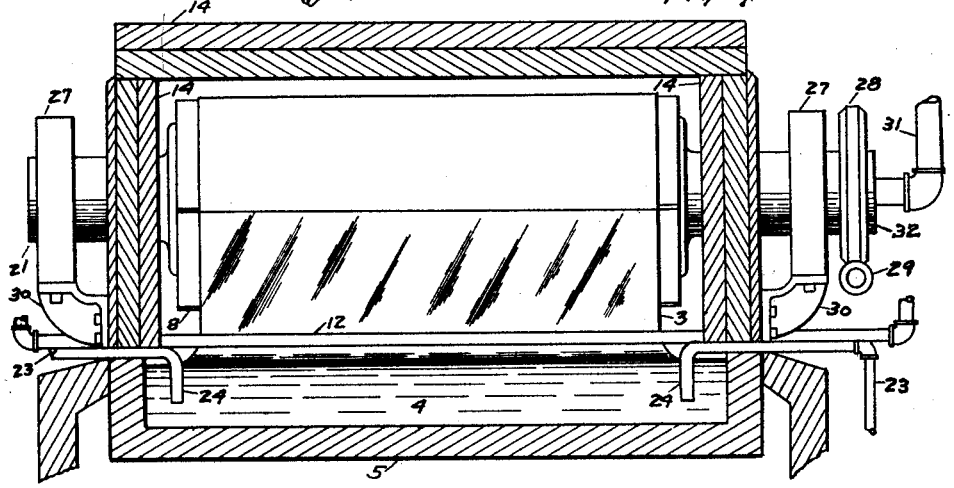
WITNESSES
Edward H Walley
Jno C Crowley
INVENTOR
Joseph P. Crowley.
BY
ATTORNEY Patented Sept. 12, 1922.

1,428,533

UNITED STATES PATENT OFFICE.

JOSEPH P. CROWLEY, OF TOLEDO, OHIO, ASSIGNOR TO THE LIBBEY-OWENS SHEET GLASS COMPANY, OF TOLEDO, OHIO, A CORPORATION OF OHIO.

APPARATUS FOR AND METHOD OF DRAWING SHEET GLASS.

Application filed May 16, 1919. Serial No. 297,667.

*To all whom it may concern:*

Be it known that I, JOSEPH P. CROWLEY, a citizen of the United States, residing at Toledo, in the county of Lucas and State of Ohio, have invented a new and useful Apparatus for and Method of Drawing Sheet Glass, of which the following is a specification.

My invention relates to the improvements in the art of drawing continuous sheet glass vertically from a prepared mass of molten glass and has for its object a means of producing sheet glass efficiently and with a small outlay of machinery.

In bending sheet glass from a vertical to a horizontal plane, by means of a roll, defects, such as impressions, set wrinkles and warpage, occasionally take place causing considerable loss in production. It is necessary to have the very most homogeneous metal in the roll to overcome impressions and it is necessary to have exact temperatures of the roll and sheet at the bending point so as to avoid sticking and warping.

The use of knurled rollers as a width maintaining device destroys the strip of glass wrung between them. They also at times affect the flatness and thickness of the glass in the sheet that lies adjacent and parallel to the knurled edge.

The specific object of my invention is to provide a simple and novel means for handling the drawn sheet in its plastic state whereby it is simultaneously flattened and its direction of travel changed to facilitate the annealing and further handling of the sheet. A novel system for maintaining the width of the sheet is also disclosed, which has been made the subject-matter of a divisional application, Serial Number 449,756, filed March 5, 1921.

Referring to the drawing:—

Fig. 1 is a longitudinal section through my apparatus and the receptacle containing the prepared mass of molten glass.

Fig. 2 is a partial transverse section of Fig. 1 showing the device I employ for maintaining the width by holding the edges of the sheet.

Fig. 3 is a detail section through the sheet edge holding device.

Fig. 4 is a vertical transverse section, through the machine showing the width of the sheet and the machine.

The prepared molten glass 4, is contained in the receptacle, 5, and its temperature is maintained by means of the oil or gas burners, 11, directed through the openings, 10, into the heating chambers 9. The sheet 3 is drawn upwardly from the mass 4, over the suitably driven rotary member 7, and thence passed downwardly through the annealing chamber 17. I employ or use the box sectioned rotor, 7, mounted upon the journals, 21, and, 32, and driven in the direction indicated by the arrow Fig. 1 by means of the worm, 29, and the wormwheel, 28. The rotor has for its supports, the bearing boxes, 27, which are fastened to the brackets, 30. This rotor furnishes all the draught necessary to pull a sheet of glass and contains the flattening means needed to flatten out the sheet in allotted lengths.

The vacuum width maintaining device consists of the pipes, 23, having pieces, 24, made preferably of carbon but of any desired material, fastened together tightly as shown in Figs. 2 and 4. The members, 24, are submerged into the molten glass, 4, at any desired depth and placed directly opposite one another at a distance corresponding to the width of the sheet required. The cored spaces, 26, may lead to a pump or to any other means that would cause a suction in the direction of the arrow, Fig. 2. The fine slots, 25, are sawed through the walls of, 24, on the side adjacent to the edges of the sheet, 3. When the air in the space, 26, is withdrawn, the atmospheric pressure upon the surface of the molten glass, 4, will force the glass against the member, 24. These slots, 25, are not large enough to admit glass. As the glass, 4, is continuously drawn into sheet form, so is the glass against the member, 24, continuously drawn into the edges of the sheet and at the same time continuously replaced against the member, 24, by suction or vacuum. The edges produced on sheet, 3, will round off, leaving a rather straight and smooth surface. This is desired as it facilitates handling and eliminates unnecessary trimming such as cutting off knurled edges.

The fluid cooled pipes, 12, are used to regulate the temperature and plasticity of the glass, 13, which is not the sheet, 3, nor the mass of molten glass, 4, but that portion of glass, raised above the glass level of the mass, 4, which has a higher temperature and plasticity than the sheet, 3, and a lower temperature than the glass, 4. In other words it is a desired portion of glass that I intend to work upon to obtain the best results in the sheet from the mass of glass and I therefore show no burners or coolers in close proximity with the surface of the mass of molten glass, 4, but on the other hand allow it to be subject to a uniform and steady temperature provided by the chambers, 1 and 2, which retain any radiated heat. Surrounding said chambers are the walls 14.

The burners, 20, directed through the holes, 19, into the chambers, 16, which are surrounded by the walls, 17, furnish the necessary heat to retard the cooling of the sheet, 3, as it passes between the guide rollers, 15.

The wind pipe, 31, is directed through the opening, 22, Fig. 1, for the purpose of cooling the rotor, 7, and especially for reducing the temperature of the surface, 6, in order to avoid its sticking to the sheet, 3. The special steel points, 8, are used to eliminate the wearing away of the corners of the rotor, 7. The reason that I employ a rotor, having flat sides and sharp corners is to concentrate the pulling strain upon the corners and allow the sheet to conform with the flatness of the sides.

While the rotor 7 is illustrated as having four equal faces 6, symmetrically arranged about the axis of the rotor, any other suitable number of faces could be used. Preferably the rotary member would be made as large as practicable, thus increasing the area of each panel 6, and providing larger panels of the finished glass.

In operation, the drawing of the sheet is started by means of a suitable bait, as is customary in this art, and the sheet is passed up and over the rotary member 7. As the hot molten glass rises between the pipes 12, its surface becomes chilled and smooth, and less plastic, and the glass stretches out to the desired strength, depending on the speed at which the sheet is drawn, and the surrounding temperatures. The suction devices 24 hold the sources of the sheet edges out to the desired width. The sharp edges 8 of the member 7, engage and bite into the inner surface of the sheet, furnishing the necessary draft, and preventing slippage of the sheet on the flattening surfaces 6. It will be noted that the perpendicular distance from the axis of rotor 7 to the center of one of the faces 6, is somewhat less than the distance from the axis to one of the corners 8. This will cause the drawn sheet to swing back and forth through a slight angle. There is a tendency for the sheet to draw vertically at all times, but the molten glass at the draw point is so stiff and sluggish that it cannot move back and forth in unison with the swinging sheet but remains practically stationary, the sheet simply swinging about the draw-point as a fulcrum.

The sheet is not severed by the members 8, but maintains its continuity, and after leaving the rotor 7 is still sufficiently plastic to straighten out along these thinned lines and pass down between the guide-rolls 15 into the annealing chamber.

What I claim is:—

1. In a continuous sheet glass drawing apparatus, a rotary device having a circumferential series of plane surfaces for engaging the sheet and changing its direction of travel, and for simultaneously flattening the sheet into a series of connected flat sections.

2. In an apparatus for continuously drawing sheet glass, a rotary device for flattening the sheet and changing its direction of travel, the sheet carrying surface of said device comprising a series of plane surfaces symmetrically arranged about the axis of the device, and sharp wear-resisting members at the edges formed by the intersecting plane surfaces, said edges engaging and holding the sheet, and the sheet being flattened upon the intermediate plane surfaces.

3. In an apparatus for drawing sheet glass, a rotary device for flattening the sheet and changing its direction of travel, said device having a series of plane sheet engaging faces, the edges formed by the intersecting plane surfaces serving as sheet gripping means, thus relieving the flattened portions of the sheet from undue strain.

4. In an apparatus for drawing sheet glass, a rotary drawing and flattening device, about which the sheet is passed, the sheet carrying surface of said device comprising a series of flat faces symmetrically arranged about the periphery of the rotary device, and means for internally cooling said flat surfaces.

5. The method of drawing a continuous sheet of glass, which consists in preparing a mass of molten glass, drawing a sheet upwardly therefrom, flattening the sheet in a series of connected sections, and simultaneously swinging the successive sections through an angle of approximately 180°, and then passing the sheet downwardly through suitable guides into an annealing chamber.

6. The method of drawing sheet glass, which consists in preparing a mass of molten glass, chilling the glass at the place from which the sheet is drawn, drawing a sheet upwardly from this chilled mass, permanently flattening spaced connected portions of the sheet and simultaneously changing the direction of travel of the sheet, and then passing the sheet into an annealing chamber.

7. The method of drawing sheet glass, which consists in drawing a sheet upwardly from a mass of molten glass, permanently flattening spaced connected portions of the sheet, and at the same time changing the direction of travel of the sheet, and then passing the sheet into an annealing chamber.

JOSEPH P. CROWLEY.

Witnesses:
  EDWARD W. WALLEY,
  JNO. C. CROWLEY.